(No Model.)

E. NICHOLSON.
WOOD SCREW.

No. 453,563. Patented June 2, 1891.

WITNESSES:
C. S. Gooding
O. Mayo

INVENTOR:
Ezekiel Nicholson
By
W. B. Tutts
Att'y

UNITED STATES PATENT OFFICE.

EZEKIEL NICHOLSON, OF LYNN, MASSACHUSETTS.

WOOD-SCREW.

SPECIFICATION forming part of Letters Patent No. 453,563, dated June 2, 1891.

Application filed January 21, 1886. Renewed May 11, 1891. Serial No. 392,375. (No model.)

*To all whom it may concern:*

Be it known that I, EZEKIEL NICHOLSON, of Lynn, in the county of Essex and Commonwealth of Massachusetts, have invented certain Improvements in Wood-Screws, of which the following, taken in connection with the accompanying drawings, is a specification.

My invention relates to wood-screws of that class in which grooves or channels are formed throughout their body portion, displacing a portion of the screw-threads and extending either in a longitudinal or spiral direction, the object being to provide a screw which may be used in thin strips of material without splitting the same.

Figure 1:
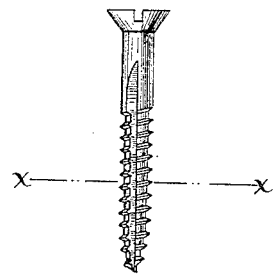
Figure 2:
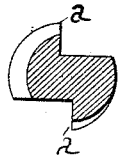

In the drawings, Figure 1 is a side elevation of my improved screw. Fig. 2 is a section on line $x\ x$ of Fig. 1.

In the insertion of screws into thin wood the penetration of the screw causes the fibers to crowd together, and this crowding causes the wood to split when there is not sufficient body to it to absorb such crowding of the fibers. It has been found, however, that by forming channels or recesses in the screws the crowded fibers may expand at such points, and in the continued insertion of the screw this expanded portion of the fibers is cut off.

It is the object, therefore, of my invention to provide a screw which will more effectually attain this object without detracting from the efficiency of the screw in its ordinary application. I form these channels opposite each other and of angular shape, the angles of the two channels being opposite to each other, as shown in Fig. 2, so that the screw is equally balanced, and while a sufficient amount of space is provided for the expansion of the crowded fibers a large threaded periphery is left for holding the screw in the material. The outwardly-extending wall of the channel upon each side is a little beyond the center line of the screw, so that a proper bearing is provided, and the outer edges $a$ form cutting-edges which cut off the fibers coming within the line thereof.

I am aware that it is not new to provide a screw with a single continuous spiral curve, nor with a series of longitudinal channels having their bottoms curved in cross-section.

What I claim is—

A wood-screw provided throughout its threaded portion with oppositely-placed straight grooves or channels, whereby the screw is evenly balanced, one side of each groove being at a right angle, or nearly so, to the surface of the screw, thus forming cutting-edges, substantially as described.

Signed at Lynn, Massachusetts, December 2, 1885.

EZEKIEL NICHOLSON.

In presence of—
M. E. WHITCOMB,
C. B. TUTTLE.